(12) United States Patent
Botrel et al.

(10) Patent No.: US 10,260,361 B2
(45) Date of Patent: Apr. 16, 2019

(54) TURBOMACHINE VANE INCLUDING AN ANTIVORTEX FIN

(71) Applicant: SAFRAN AIRCRAFT ENGINES, Paris (FR)

(72) Inventors: Erwan Daniel Botrel, Alfortville (FR); Laurent Patrick Robert Coudert, Nandy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 88 days.

(21) Appl. No.: 14/740,405

(22) Filed: Jun. 16, 2015

(65) Prior Publication Data

US 2015/0361808 A1 Dec. 17, 2015

(30) Foreign Application Priority Data

Jun. 17, 2014 (FR) ...................................... 14 55527

(51) Int. Cl.
*F01D 5/02* (2006.01)
*F01D 5/14* (2006.01)
(Continued)

(52) U.S. Cl.
CPC ................ *F01D 9/041* (2013.01); *F01D 5/02* (2013.01); *F01D 5/20* (2013.01); *F01D 5/145* (2013.01);
(Continued)

(58) Field of Classification Search
CPC ... F01D 5/02; F01D 5/20; F01D 5/147; F01D 5/18; F01D 5/141; F01D 5/145;
(Continued)

(56) References Cited

U.S. PATENT DOCUMENTS 1,955,929 A 4/1934 Mueller
3,706,512 A * 12/1972 Strelshik ................ F04D 21/00
416/194
(Continued)

FOREIGN PATENT DOCUMENTS

DE 199 13 269 A1 9/2000
EP 1 312 754 A2 5/2003
(Continued)

OTHER PUBLICATIONS

French Preliminary Search Report dated Mar. 11, 2015 in French Application 14 55527, filed on Jun. 17, 2014 (with English Translation of Categories of Cited Documents).

*Primary Examiner* — Richard A Edgar
(74) *Attorney, Agent, or Firm* — Oblon, McClelland, Maier & Neustadt, L.L.P.

(57) ABSTRACT

The invention relates to a turbomachine vane comprising a root and a blade including a median main plane having a longitudinal and radial main orientation, which is carried by the root, the blade including a leading edge located at an upstream longitudinal end, a trailing edge located at a longitudinal end downstream of the leading edge with respect to a gas stream flowing around the blade, a lower surface wall and an upper surface wall which are located laterally remote from each other and each connecting the leading edge to the trailing edge, and a top located at the free outer radial end of the blade, the blade further including a fin having a longitudinal main orientation which is carried by the lower surface side, which is located at the top of the blade, wherein the fin is radially inwardly offset with respect to the top of the blade.

9 Claims, 3 Drawing Sheets

(51) Int. Cl.
*F01D 5/20* (2006.01)
*F01D 9/04* (2006.01)

(52) U.S. Cl.
CPC .... *F05D 2220/30* (2013.01); *F05D 2240/127* (2013.01); *Y02T 50/671* (2013.01); *Y02T 50/673* (2013.01)

(58) Field of Classification Search
CPC .......... F01D 5/186; F01D 5/225; F01D 9/041; F05D 2240/127; F05D 2240/307; Y02T 50/673
USPC ...................... 416/228, 235, 237, 238, 193 R
See application file for complete search history.

(56) References Cited

U.S. PATENT DOCUMENTS

| | | | | |
|---|---|---|---|---|
| 6,905,309 B2* | 6/2005 | Nussbaum | ................ | F01D 5/10 29/889.1 |
| 7,351,035 B2* | 4/2008 | Deschamps | ............... | F01D 5/20 416/92 |
| 8,092,178 B2* | 1/2012 | Marini | ..................... | F01D 5/20 416/96 R |
| 8,414,265 B2* | 4/2013 | Willett, Jr. | ................ | F01D 5/20 416/228 |
| 8,591,195 B2* | 11/2013 | Di Florio | .................. | F01D 5/16 416/224 |
| 9,011,081 B2* | 4/2015 | Gomez | ................... | F01D 5/141 415/151 |
| 9,188,017 B2* | 11/2015 | Xu | .......................... | F01D 9/041 |
| 2010/0135813 A1 | 6/2010 | Marini et al. | | |
| 2012/0063909 A1* | 3/2012 | Bottome | .................. | F01D 5/14 416/228 |
| 2014/0322028 A1* | 10/2014 | Grohens | ................. | F01D 5/141 416/97 R |

FOREIGN PATENT DOCUMENTS

WO    WO 2013/072610 A1    5/2013
WO    WO 2013072610 A1 *    5/2013   ............ F01D 5/141

\* cited by examiner

TURBOMACHINE VANE INCLUDING AN ANTIVORTEX FIN

TECHNICAL FIELD

The invention relates to a turbomachine vane made for restricting disturbances likely to be formed at the vane head.

The invention relates more particularly to a vane for a turbomachine high pressure turbine including a lateral fin located on the lower surface side of the vane.

STATE OF PRIOR ART

In a turbomachine high pressure turbine, gases from the combustion chamber exert strong temperature and pressure stresses on the turbine vanes.

Thus, the combustion gases can bring the vane blades to temperatures going above the permissible temperature limit for the blades, which results in incorporating to the blades solutions for continuously cooling them.

Thus, heating and cooling blades cause dimensional variations in the blades. These dimensional variations have to be taken into account to prevent the top of each blade from coming in contact with the fixed turbine casing, which surrounds the vanes.

Thus, an operational radial clearance is present in the turbine, between the top of the vanes and the fixed casing.

Because of the pressure difference between the lower surface and the upper surface of each blade, a vortex is formed at this radial clearance, which consequently produces aerodynamic losses reducing the turbine efficiency and produces a further heating located at the top of the blade.

To restrict this formation of vortexes, document U.S. Pat. No. 1,955,929 describes a blade including a fin laterally extending the top face of the blade, by projecting from the lower surface side of the blade.

Although this embodiment enables turbulence which is formed at the top of the blade to be restricted, the presence of the fin increases the general moveable weight of the vane, which induces further stresses on the blade when the turbomachine rotates.

Thus, the fin can come in contact with the face facing the casing when the blade is too highly expanded, under the action of heat or under the action of centrifugal forces.

The purpose of the invention is to provide a vane including a fin which is designed so as to solve the aforesaid drawbacks.

DISCLOSURE OF THE INVENTION

The invention provides a turbomachine vane comprising a root and a blade including a median main plane having a longitudinal and radial main orientation, which is carried by the root, the blade including a leading edge located at an upstream longitudinal end, a trailing edge located at a longitudinal end downstream of the leading edge with respect to a gas stream flowing around the blade, a lower surface wall and an upper surface wall which are located laterally remote from each other and each connecting the leading edge to the trailing edge, and a top located at the free outer radial end of the blade, the blade further including a fin having a longitudinal main orientation which is carried by the lower surface side, which is located at the top of the blade, characterized in that the fin is radially inwardly offset with respect to the top of the blade.

The inward radial offset of the fin enables the formation of vortexes to be prevented at the top of the blade and thus the impact of the fin weight on the inertia of the vane to be restricted.

It will be understood that the longitudinal main orientation of the fin means that the fin can be both longitudinal and tilted relative to this longitudinal orientation. Preferably, the top of the blade includes a hollow recess which is radially outwardly open and including a bottom wall located radially remote from the top of the blade, and the fin is radially inwardly offset with respect to the bottom wall of the recess.

Preferably, the fin includes an upstream longitudinal end which is longitudinally offset downstream of the leading edge of the blade.

Preferably, the fin includes an upstream longitudinal end which is longitudinally offset upstream of the trailing edge of the blade.

Preferably, the blade includes at least one bore which leads into a lateral end face of the fin and which leads into a cavity formed in the blade.

Preferably, a median longitudinal plane of the fin is perpendicular to the main plane of the blade.

Preferably, a median longitudinal plane of the fin is tilted relative to the main plane of the blade.

Preferably, the connection between the lower surface side and the radially inner face of the fin is convex-shaped.

Preferably, the upstream longitudinal end of the fin is radially offset with respect to the downstream longitudinal end of the fin.

The invention also relates to a turbomachine high pressure turbine rotor including a plurality of vanes according to the invention which are regularly distributed about the main axis of rotation of the rotor.

The invention also relates to an aircraft turbomachine including a high pressure turbine to which a plurality of vanes according to the invention are mounted.

BRIEF DESCRIPTION OF THE DRAWINGS

Further characteristics and advantages of the invention will appear upon reading the detailed description that follows for the understanding of which the appended figures will be referred to in which.

DETAILED DISCLOSURE OF PARTICULAR EMBODIMENTS

Figure 1:
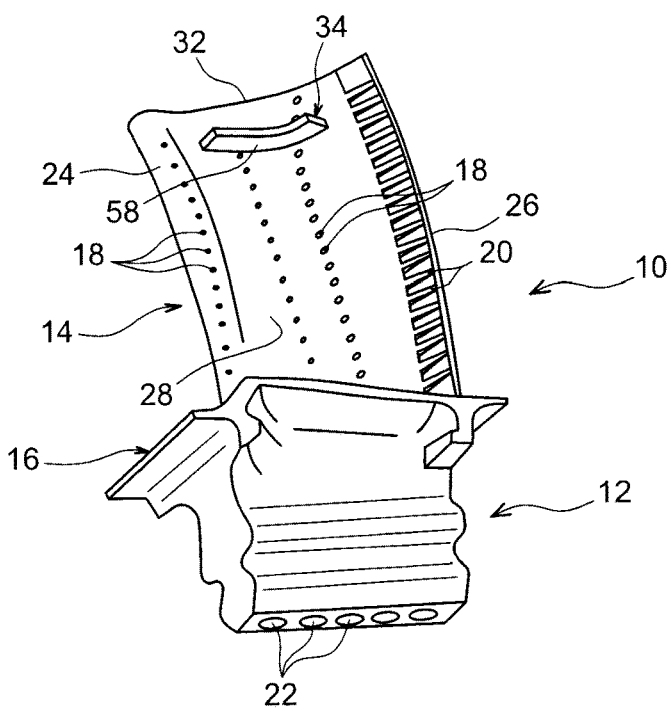
FIG. 1 is a perspective schematic representation of a turbine vane for a turbomachine including a fin according to the invention.
Figure 2:
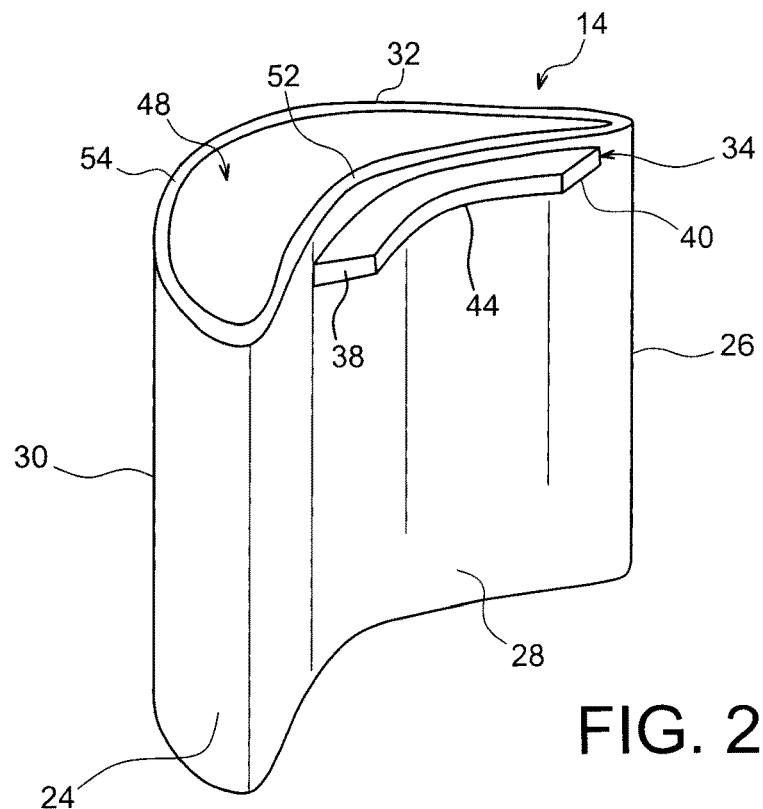
FIG. 2 is a perspective schematic representation of the vane blade represented in FIG. 1.

In FIG. 1, a turbomachine vane 10 is represented, and more particularly a vane 10 for a turbomachine high pressure turbine which includes a root 12 for mounting the vane 10 to a rotor disk of the turbomachine (not represented) and a blade 14 having a radial main orientation which is able to cooperate with gases from the combustion chamber of the turbomachine.

The vane 10 also includes an intermediate portion 16 the radially outer face of which is shaped to partly delimit the flow stream of combustion gases.

The vane 10 is intended to be subjected to hot gases from the combustion chamber (not represented). A plurality of ports 18 and grooves 20 are distributed on the blade 14 to allow the flow of a cooling air stream which is injected by inlet ports 22 formed in the root 12 of the vane.

The blade 14 is defined by a leading edge 24 which is located at an upstream longitudinal end of the blade, a trailing edge 26 located at a downstream longitudinal end of the blade, and thus downstream of the leading edge, and a concave lower surface wall 28 on which the pressure of the combustion gases is exerted, a convex upper surface wall 30 located laterally remote from the lower surface wall 28, and a top 32 located at the outer radial end of the blade, located farthest from the root 12 of the vane 10.

The blade 14 also includes a lateral fin 34 which is carried by the lower surface side 28 and which counteracts the formation of vortexes at the top of the blade 14.

Indeed, as can be seen in FIGS. 3 to 6, the combustion gases partly flow radially outwardly along the lower surface side 28. Thereby, they are blocked by the fin 34 before reaching the top 32 of the blade 14.

A vortex 36 is then formed along the lower surface wall 28 which is less energetic than the vortexes formed at the top of a blade 14 according to prior art.

According to the embodiment represented in the figures, this fin 34 extends in a plane having a longitudinal orientation, that is it is generally parallel to the end edge of the lower surface side 28 of the blade 14 and both longitudinal ends 38, 40 of the fin 34 are located at the same radial position. According to an alternative embodiment not represented, the fin is tilted relative to the longitudinal direction, that is its upstream longitudinal end 38 is radially offset with respect to the downstream longitudinal end 40 of the fin 34.

Thus, either the upstream longitudinal end 38 of the fin 34 is radially outwardly located with respect to the downstream longitudinal end 40 of the fin 34, or conversely, the upstream longitudinal end 38 of the fin 34 is radially inwardly located with respect to the downstream longitudinal end 40 of the fin 34.

According to the invention, and as can be seen in the figures, the fin 34 is radially inwardly offset with respect to the top 32 of the blade 14. This radial positioning of the fin 34 enables it to be moved away from the wall of the fixed casing near which the top 32 of the blade 14 operates, in order to avoid any contact during the operation of the turbomachine and thus to limit any risk of damaging the fin 34.

The interaction of the fin 34 with the stream of hot gases causes the fin 34 to be heated, which has to be controlled.

To that end, the fin 34 includes cooling means similar to the ports 18 and grooves 20 formed in the blade 14.

The fin 34 therefore includes at least one bore 42 which extends from a free lateral end face 44 of the fin to a cavity 46 formed inside the blade 14.

This cavity 46 allows communication between the ports 18 and the grooves 20 with the inlet ports 22. Thereby, it is fed with cooling air, which consequently also feeds each bore 42 of the fin 34.

As can be seen in FIGS. 3 to 6, the top 32 of the blade 14 includes a hollow recess 48 commonly called "bathtub", which is radially outwardly open. This recess 48 includes a bottom wall 50 which separates the recess 48 from the cavity 46 and lateral walls 52, 54 formed by the outer radial ends of the lower surface 28 and upper surface 30 walls.

Preferably, the fin 34 is radially inwardly offset with respect to the bottom wall 50 of the recess. This enables the fin 34 to be further protected from contact wear with the fixed casing of the turbine since it is the lateral walls of the recess 48 which will first wear out by contact with the fin 34.

Furthermore, this radial offset of the fin 34 with respect to the bottom wall 50 enables the bore(s) 42 to open into the cavity 46, that is radially inwardly with respect to the bottom wall 50.

Figure 3:
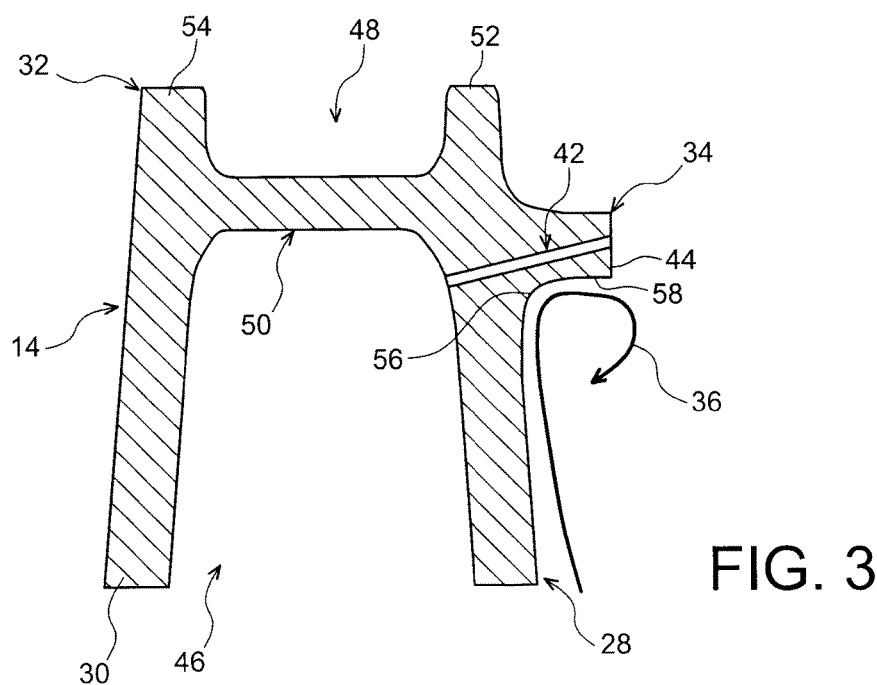
FIGS. 3 to 6 are cross sections of the blade represented in FIG. 2, representing different embodiments of the fin according to the invention.

According to a first embodiment represented in FIG. 3, the fin 34 extends in a plane perpendicular to the radial main axis of the vane 10, that is in a lateral longitudinal plane.

Figure 4:
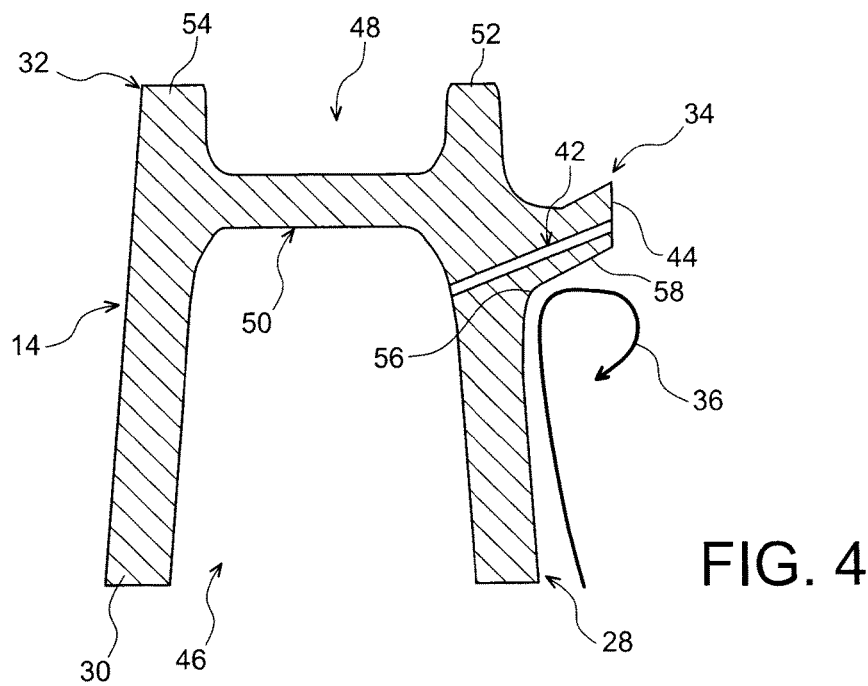
Figure 5:
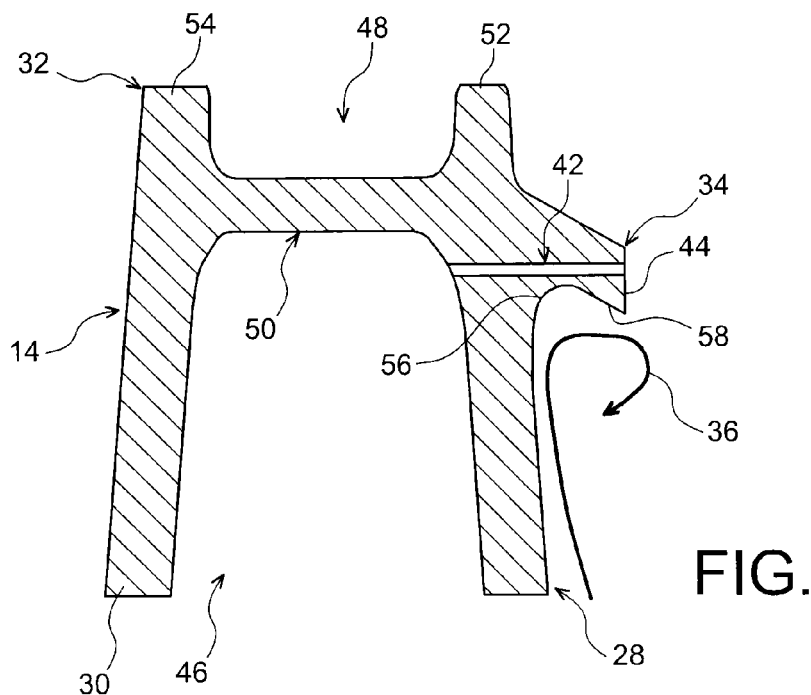

According to alternative embodiments represented in FIGS. 4 and 5, the fin 34 is tilted relative to the radial main axis of the vane 10. According to the alternative represented in FIG. 4, the fin 34 is radially outwardly tilted, on the alternative represented in FIG. 5, the fin 34 is radially inwardly tilted.

As can be seen in FIG. 4, the orientation of each bore 42 is similar or identical to the tilt of the fin 34. This allows in particular sufficient matter to be kept about the bores 42, thus reinforcing the fin 34. This embodiment can also be applied when the fin 34 extends in a plane perpendicular to the radial main axis of the vane 10 or when the fin 34 is radially outwardly or inwardly tilted.

According to another embodiment represented for example in FIGS. 3 and 5, the orientation of each bore 42 differs from the tilt of the fin 34. For example, as represented in FIG. 3, each bore 42 is radially outwardly tilted, to enable the bore 42 to be connected with the cavity 46 when the fin 34 is radially outwardly offset with respect to the bottom wall 50. According to another example, as represented in FIG. 5, each bore 42 is perpendicular to the radial main axis of the vane 10, irrespective of the orientation of the fin 34.

According to yet another aspect of the fin 34, the connection 56 between the lower surface wall 28 and the radially inner face 58 of the fin 34 is shaped to avoid the so-called "confined vortex" which consists of the formation of a localized vortex on the connection 56.

Figure 6:
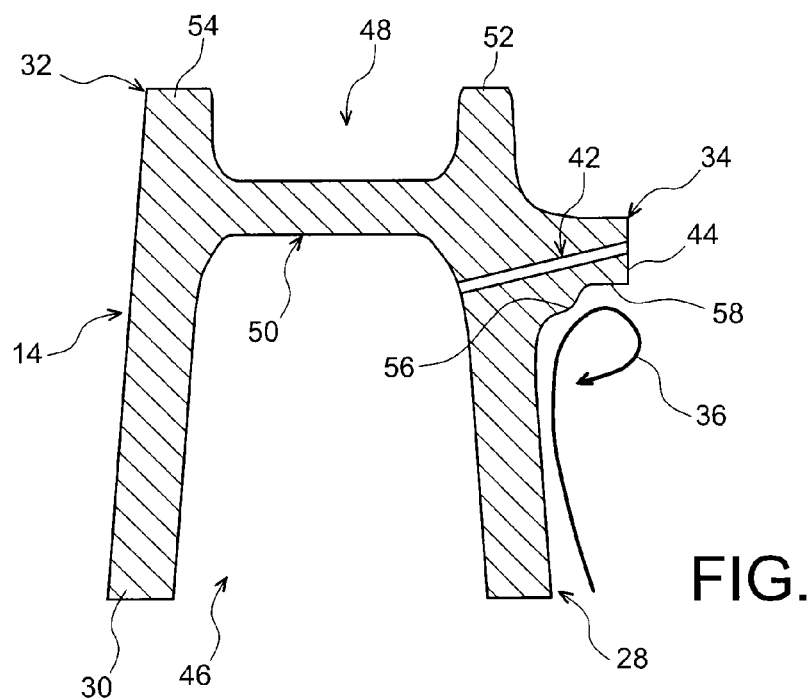

This phenomenon is controlled either by adapting the radius of curvature of this connection 56, or, as can be seen in FIG. 6, by forming a convex connection which is laterally and radially inwardly bulged.

The fin 34 represents a certain weight rotatably moveable at a distance from the axis of rotation of the rotor.

To restrict impacts of the fin on the blade, by the strains it generates, in particular centrifugal strains, the general weight of the fin 34 is defined such that it is minimally permissible to provide its function.

To that end, the upstream longitudinal end 38 of the fin 34 is longitudinally offset downstream of the leading edge 24 of the blade 14 and the downstream longitudinal end 40 of the fin 34 is longitudinally offset upstream of the trailing edge 26 of the blade 14.

Consequently, the longitudinal dimension of the fin is lower than the longitudinal dimension of the blade 14.

Thus, optimizing the weight of the fin 34 is carried out by defining a radial thickness of the fin enabling the bores 42 to be made, as well as the lateral dimension of the fin enabling gas streams which could generate vortexes at the top of the vane, to be blocked.

The number of bores 42 also has an influence on the weight of the fin 34. Thereby, by multiplying the number of bores 42, it is possible to reduce its weight, while improving cooling of the fin 34.

The invention also relates to a high pressure turbine rotor to which vanes 10 as previously described are mounted, this rotor includes a disk at the periphery of which grooves distributed throughout its periphery are formed to receive the roots 12 of the vanes 10. The rotor thus carries a plurality of vanes 10 according to the invention, which are regularly distributed about the main axis of rotation of the rotor.

The invention claimed is:

1. A turbomachine vane comprising a root and a blade including a median main plane having a longitudinal and radial main orientation, which is carried by the root, the blade including a leading edge located at an upstream longitudinal end, a trailing edge located at a longitudinal end downstream of the leading edge with respect to a gas stream flowing around the blade, a lower surface wall and an upper surface wall which are located laterally remote from each other and each connecting the leading edge to the trailing edge, and a top located at the free outer radial end of the blade, the blade further including a fin having a longitudinal main orientation which is carried by the lower surface wall, and which counteracts the formation of vortexes at the top of the blade, the fin including an upstream longitudinal end which is longitudinally offset downstream of the leading edge of the blade, a downstream longitudinal end which is longitudinally offset upstream of the trailing edge of the blade, and a lateral free end which is laterally offset a predetermined amount from the lower surface wall between the upstream longitudinal end and the downstream longitudinal end such that a shape of the lateral free end is similar to a shape of the lower surface wall, the fin being radially inwardly offset with respect to the top of the blade, and the top of the blade including a hollow recess which is radially outwardly open and including a bottom wall located radially remote from the top of the blade, wherein the fin is radially inwardly offset with respect to the bottom wall of the recess, wherein a connection between the lower surface wall and a radially inner face of the fin is convex-shaped, wherein a longitudinal dimension of the fin is lower than a longitudinal dimension of the blade, and wherein the fin includes a bore passing therethrough, a first end of the bore at the lateral free end of the fin and a second end of the bore in fluid communication with a cavity formed in the blade.

2. The turbomachine vane according to claim 1, wherein a median longitudinal plane of the fin is perpendicular to the main plane of the blade.

3. The turbomachine vane according to claim 1, wherein a median longitudinal plane of the fin is tilted relative to the main plane of the blade.

4. The turbomachine vane according to claim 1, wherein the upstream longitudinal end of the fin is radially offset with respect to the downstream longitudinal end of the fin.

5. A turbomachine high pressure turbine rotor including a plurality of vanes according to claim 1, which are regularly distributed about the main axis of rotation of the rotor.

6. The turbomachine vane according to claim 1, wherein a median longitudinal plane of the fin is radially inwardly tilted with respect to a radial main axis of the vane.

7. The turbomachine vane according to claim 1, wherein a median longitudinal plane of the fin is perpendicular to the main plane of the blade, or radially inwardly tilted with respect to a radial main axis of the vane.

8. The turbomachine vane according to claim 1, wherein the connection between the lower surface wall and the radially inner face of the fin is laterally and radially inwardly bulged.

9. The turbomachine vane according to claim 1, wherein the first end of the bore is radially inward of an inner surface of the bottom wall of the recess delimiting the cavity formed in the blade.

* * * * *